United States Patent
Huijsing et al.

(10) Patent No.: US 12,302,481 B2
(45) Date of Patent: May 13, 2025

(54) AUTOMATED OVEN CONFIGURATION

(71) Applicant: B/E Aerospace, Inc., Winston Salem, NC (US)

(72) Inventors: Hans Huijsing, IJsselstein UT (NL); Varun Raman, The Hague (NL)

(73) Assignee: B/E AEROSPACE, INC., Winston Salem, NC (US)

( * ) Notice: Subject to any disclaimer, the term of this patent is extended or adjusted under 35 U.S.C. 154(b) by 369 days.

(21) Appl. No.: 17/750,840

(22) Filed: May 23, 2022

(65) Prior Publication Data

US 2022/0418054 A1    Dec. 29, 2022

(30) Foreign Application Priority Data

Jun. 28, 2021  (EP) .................................... 21181979

(51) Int. Cl.
| | | |
|---|---|---|
| *H05B 6/64* | (2006.01) | |
| *B64D 11/04* | (2006.01) | |
| *G06K 7/10* | (2006.01) | |
| *F24C 7/08* | (2006.01) | |

(52) U.S. Cl.
CPC ........... *H05B 6/6441* (2013.01); *B64D 11/04* (2013.01); *G06K 7/10297* (2013.01)

(58) Field of Classification Search
CPC .. H05B 6/6441; B64D 11/04; G06K 7/10297; F24C 7/085
USPC ........................................................ 700/300
See application file for complete search history.

(56) References Cited

U.S. PATENT DOCUMENTS

| | | | |
|---|---|---|---|
| 8,321,073 B2 * | 11/2012 | McAvoy ................... | H02J 3/14 701/32.7 |
| 10,133,992 B2 | 11/2018 | Walter et al. | |
| 10,984,203 B1 | 4/2021 | Huijsing | |
| 2008/0120187 A1 | 5/2008 | Wesley et al. | |
| 2010/0213187 A1 * | 8/2010 | Bandholz ............. | H05B 6/6441 219/506 |
| 2019/0309955 A1 | 10/2019 | Castillo et al. | |

(Continued)

FOREIGN PATENT DOCUMENTS

| | | |
|---|---|---|
| JP | 6000534 B2 | 9/2016 |
| WO | 2008084917 A1 | 7/2008 |
| WO | 2015069325 A1 | 5/2015 |

(Continued)

OTHER PUBLICATIONS

Abstract for JP6000534 (B2), Published: Sep. 28, 2016, 1 page.
European Search Report for Application No. 21181979.2, mailed Dec. 17, 2021, 10 pages.

*Primary Examiner* — Michael J Brown
(74) *Attorney, Agent, or Firm* — CANTOR COLBURN LLP

(57) ABSTRACT

A system for automated oven configuration. The system includes a meal card comprising a radio-frequency identification, RFID, tag that is configured to identify a type of meal, cooking/heating time and a temperature setting. The system further includes an oven comprising an RFID reader that is configured to read the RFID tag to determine the type of meal, cooking/heating time and the temperature setting. The system also includes a central programming unit configured to automatically set the temperature and cooking/heating time in the oven based on the information received by the RFID tag and RFID reader.

11 Claims, 2 Drawing Sheets

(56) References Cited

U.S. PATENT DOCUMENTS

2020/0108932 A1  4/2020  Vandewall et al.
2021/0243855 A1* 8/2021  Burress .................. G10L 13/00

FOREIGN PATENT DOCUMENTS

| WO | 2017176116 A1 | 10/2017 |
| WO | 2018077466 A1 | 5/2018 |
| WO | 2020234336 A1 | 11/2020 |

\* cited by examiner

AUTOMATED OVEN CONFIGURATION

CROSS REFERENCE TO RELATED APPLICATIONS

This application claims priority to European Patent Application No. 21181979.2 filed Jun. 28, 2021, the entire contents of which is incorporated herein by reference.

TECHNICAL FIELD

This disclosure relates to automatic configuration of an oven.

BACKGROUND

Ovens in vehicles, such as aircraft, are used to heat or cook food to be offered to passengers travelling to their intended destination. Cabin attendants provide an in meal service to passengers conventionally on short, medium or long haul journeys. Presently, the meals are placed in an oven and the cabin attendants would then need to set the specific temperature and time of cooking for each meal set that is being cooked. This may result in error by the cabin attendant and is not an efficient process.

The present disclosure provides a solution to this need.

SUMMARY OF DISCLOSURE

There is provided a system for automated oven configuration, said system comprising a meal card comprising a radio-frequency identification, RFID, tag that is configured to identify a type of meal, cooking/heating time and a temperature setting. The system further includes an oven comprising an RFID reader that is configured to read the RFID tag to determine the type of meal, cooking/heating time and the temperature setting. The system also includes a central programming unit configured to automatically set the temperature and cooking/heating time in the oven based on the information received by the RFID tag and RFID reader.

The system may include a meal carrier that includes the meal card to be provided in close proximity to the RFID reader.

The RFID reader may be located in, on, or around the oven. The RFID reader may be located in a door of the oven, in use. The RFID tag may be provided in close proximity to, or on, the door of the oven.

The system may further include menu settings that are configured to be altered by the central programming unit after determination of the type of meal, cooking/heating time and temperature. The system further includes a memory to store the menu settings that have been altered by the central programming unit.

There is also provided an aircraft galley that includes the system described above.

Further, a method for automated oven configuration is also provided. The method comprises providing a meal card that includes a radio-frequency identification, RFID, tag to identify a type of meal, cooking/heating time and a temperature setting. The method also includes providing an oven that includes an RFID reader to read the RFID tag to determine the type of meal, cooking/heating time and the temperature setting. The method further includes automatically setting, via a central programming unit, the temperature and cooking/heating time in the oven based on the information received by the RFID tag and RFID reader.

The method may further include providing a meal carrier that includes the meal card to be provided in close proximity to the RFID reader.

The RFID reader may be located in, on, or around the oven. The RFID reader may be located in a door of the oven. The RFID tag may be provided in close proximity to, or on, the door of the oven, in use.

The method may further include menu settings that are configured to be altered by the central programming unit after determination of the type of meal, cooking/heating time and temperature. The method may further include a memory to store the menu settings that have been altered by the central programming unit.

DETAILED DESCRIPTION

Figure 1:
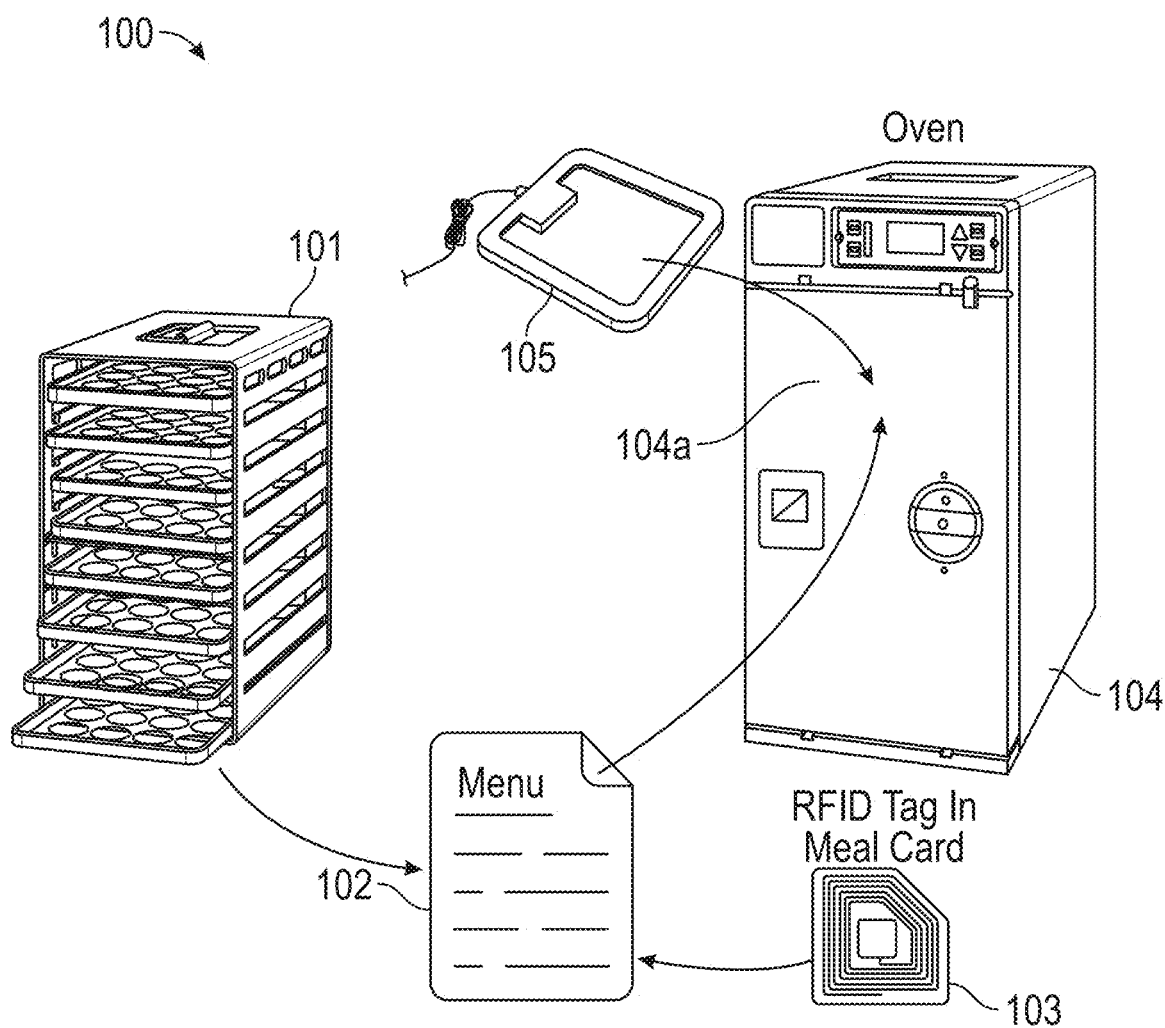
FIG. 1 shows a system for oven configuration.

FIG. 1 shows a general overview of a system 100 for oven configuration. The system 100 may include a meal carrier 101 which is configured to hold one or more meals (not shown). The meal carrier 101 may be accompanied by a removable 'meal card' that indicates to a cabin attendant the type of meal that is to be cooked and distributed to passengers. The meal card may include a radio-frequency identification (hereinafter RFID) tag 103 in or on the meal card. The RFID tag 103 may hold information relating to the meal. For example, the RFID tag 103 may include temperature settings and cooking/heating time for that particular meal. In other words, the RFID tag 103 may include digital tokens that identify the type of meal, the temperature setting required and the time required for cooking/heating.

The system 100 may further include an oven 104. The oven 104 may include an RFID reader 105 in, on, or around the oven 104. In a particular example of FIG. 1, the RFID reader 105 may be located in, or on, an oven door 104a. It is envisaged however that the RFID reader 105 may be located anywhere within the oven that is within reach of reading the RFID tag 103 provided in or on the meal card 102. As a general principal, when the RFID tag 103 is in proximity to the RFID reader 105, the RFID reader 105 in, on, or around the oven 104 may be configured to receive the digital tokens from the RFID tag 103 and send them to a central programming unit (shown in FIG. 2). The central programming unit then determines the type of meal, cooking/heating time and temperature setting of the specified meal. The settings of the oven 104 are then automated based on this information to heat/cook the meals to a desired temperature.

The meal card 102 could, as an example, be placed on the door 104a of the oven 104 such that the RFID reader 105 can receive information, or digital tokens, from the RFID tag 103. Of course, the meal card 102 does not need to placed on the door 104a, but would need to be placed in proximity to the RFID reader 105 in order for the information to be received.

Figure 2:
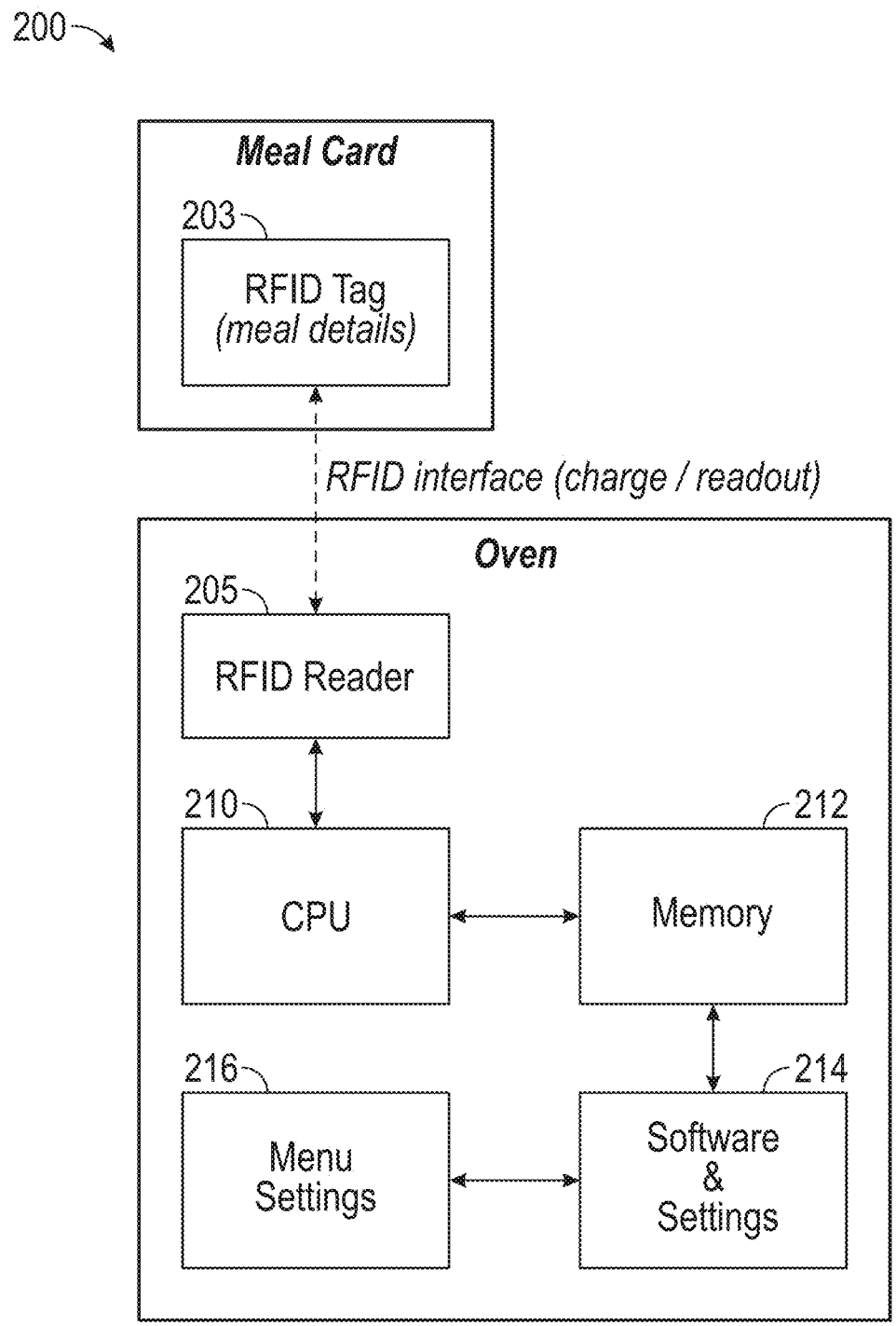
FIG. 2 shows a system architecture of the system for oven configuration of FIG. 1.

A system architecture 200 of the system 100 is shown in FIG. 2. As mentioned above, the meal card includes the RFID tag 203, which corresponds to the RFID tag 103 described above. The oven includes the RFID reader 205, which corresponds to the RFID reader 105 described above. Further, there may be provided a central programming unit 210, memory 212, software 214 and menu settings 216.

As mentioned above in relation to FIG. 1, when the RFID tag 203 is in proximity to the RFID reader 205, the RFID reader 205 in, on, or around the oven 104 may be configured to receive the digital tokens from the RFID tag 203 and send them to the central programming unit 210. The central programming unit 210 then determines the type of meal, cooking/heating time and temperature setting of the specified meal and may write these to memory 212 or directly start the cooking process. The settings of the oven 104 are then automated by the central programming unit 210, based on the information received by the RFID reader 205 in order to heat/cook the meals to a desired temperature.

As an example, the central programming unit 210, after determination of the type of meal to be cooked, may alter the menu settings 216 for that particular type of meal (e.g. cooking time, temperature etc). The menu settings 216 may then update the software and settings 214 in order to be sent to the central programming unit 210 to cook the meal according to the menu settings 216. The memory 212 may store the software and settings 214, and also the menu settings 216 such that particular cooking/heating time and temperature settings may be easily recalled from the memory 216 when further meal cards are presented, in use.

The above described systems allow for various meals to be cooked without having to manually input the temperature setting and/or cooking time for the specified meals.

Although this disclosure has been described in terms of preferred examples, it should be understood that these examples are illustrative only and that the claims are not limited to those examples. Those skilled in the art will be able to make modifications and alternatives in view of the disclosure which are contemplated as falling within the scope of the appended claims.

The invention claimed is:

1. A system for automated oven configuration, said system comprising:
    a meal card comprising a radio-frequency identification, RFID, tag that is configured to identify a type of meal, cooking/heating time and a temperature setting;
    an oven comprising an RFID reader that is configured to read the RFID tag to determine the type of meal, cooking/heating time and the temperature setting; and
    a central programming unit configured to automatically set the temperature and cooking/heating time in the oven based on the information received by the RFID tag and RFID reader;
    wherein the system further includes menu settings that are configured to be altered by the central programming unit after determination of the type of meal, cooking/heating time and temperature;
    wherein the system further includes a memory to store the menu settings that have been altered by the central programming unit.

2. The system of claim 1, wherein the system includes a meal carrier that includes the meal card to be provided in close proximity to the RFID reader.

3. The system of claim 1, wherein the RFID reader is located in, on, or around the oven.

4. The system of claim 3, wherein the RFID reader is located in a door of the oven, in use.

5. The system of claim 4, wherein the RFID tag is provided in close proximity to, or on, the door of the oven.

6. An aircraft galley including the system of claim 1.

7. A method for automated oven configuration, the method comprising:
    providing a meal card that includes a radio-frequency identification, RFID, tag to identify a type of meal, cooking/heating time and a temperature setting;
    providing an oven that includes an RFID reader to read the RFID tag to determine the type of meal, cooking/heating time and the temperature setting; and
    automatically setting, via a central programming unit, the temperature and cooking/heating time in the oven based on the information received by the RFID tag and RFID reader;
    altering menu settings with the central programming unit after determination of the type of meal, cooking/heating time and temperature; and
    storing, in a memory, the menu settings that have been altered by the central programming unit.

8. The method of claim 7, wherein the method further includes providing a meal carrier that includes the meal card to be provided in close proximity to the RFID reader.

9. The method of claim 7, wherein the RFID reader is located in, on, or around the oven.

10. The method of claim 9, wherein the RFID reader is located in a door of the oven.

11. The method of claim 10, wherein the RFID tag is provided in close proximity to, or on, the door of the oven, in use.

* * * * *